United States Patent [19]
Bschorr et al.

[11] Patent Number: 5,528,005
[45] Date of Patent: Jun. 18, 1996

[54] OSCILLATION ABSORBER FOR THE ABSORPTION OF STRUCTURE-BORNE SOUND

[75] Inventors: Oskar Bschorr; Klaus Zimmerman, both of München, Germany

[73] Assignee: Deutsche Aerospace AG, Germany

[21] Appl. No.: 327,493

[22] Filed: Oct. 21, 1994

[30] Foreign Application Priority Data

Oct. 30, 1993 [DE] Germany .................. 43 37 162.0

[51] Int. Cl.⁶ .................................................. F16F 15/00
[52] U.S. Cl. ............................................ 181/208; 188/379
[58] Field of Search ............................ 181/207, 208, 181/209; 188/378, 379, 380; 248/559

[56] References Cited

U.S. PATENT DOCUMENTS 4,232,762 11/1980 Bschoor .................. 188/379
5,240,221 8/1993 Thomasen .............. 181/207 X

FOREIGN PATENT DOCUMENTS

3113268C2 10/1982 Germany.

*Primary Examiner*—Khanh Dang
*Attorney, Agent, or Firm*—Evenson, McKeown, Edwards & Lenahan

[57] ABSTRACT

The vibration absorber for the absorption of structure-borne sound has a wave conducting element made of mass-spring elements layered on top of each other and extending in the wave propagation direction. The mass-spring elements are configured as bending beams or plates, with a resilience which decreases in the wave propagation direction. The mass-spring elements are connected with each other by spacers which are arranged offset in respect to each other, in such a way that when they are affected by pressure or pulling at least one mass-spring element is bent.

27 Claims, 3 Drawing Sheets

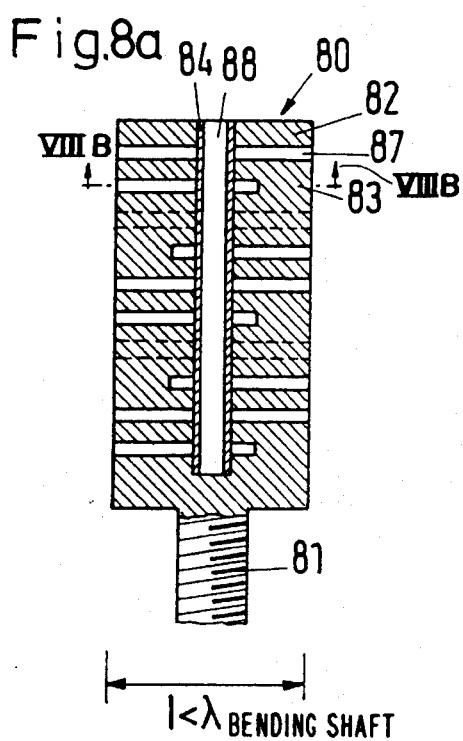
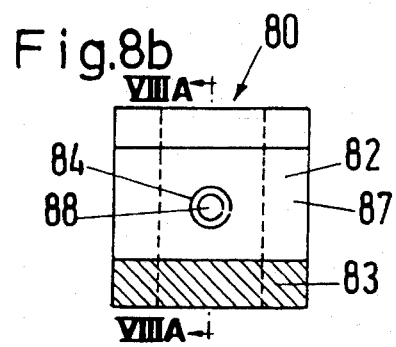
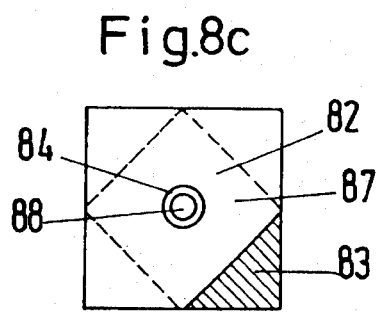
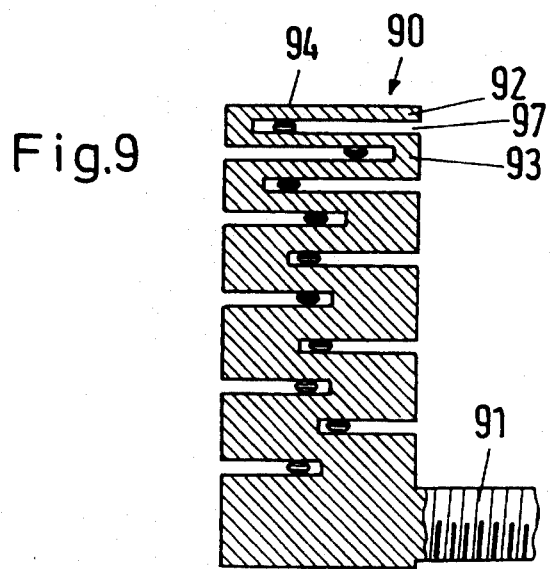
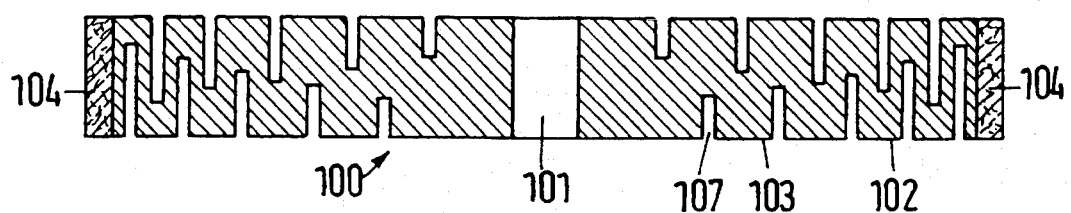

OSCILLATION ABSORBER FOR THE ABSORPTION OF STRUCTURE-BORNE SOUND

BACKGROUND AND SUMMARY OF THE INVENTION

The invention relates to a damping device for absorbing structure-borne sound, the device comprising a wave conducting element with a succession of layers made of mass-spring elements and extending in the direction of the propagation of the waves.

An oscillation absorber of this generic type is described in German patent document DE 31 13 268 C2. In this absorber, the individual mass elements taper in the direction of the propagation of the structure-borne sound waves, so that the entire absorber has the shape of a part of a horn. The spring elements can either be made with elastic plastic materials or, in accordance with a particular exemplary embodiment of German patent document DE 31 13 268 C2, by means of spheres inserted into pan-shaped depressions of the mass elements. However, in either case the mass elements are rigid. While the employment of plastic materials is limited because of the relatively narrow temperature range, the use of spheres and corresponding pan-shaped depressions requires a relatively large outlay in fabrication.

It is therefore an object of the present invention to provide a broad-band vibration damping element in the form of a wave conductor, which can be produced with a small manufacturing outlay and, if possible, has no plastic material, or only a minute and easily detachable plastic portion.

This object is attained by the vibration damping element according to the invention which has a succession of layers of mass-spring elements, the layers being arranged in the direction of propagation of the mechanical waves. The mass-spring elements are formed as bending beams or plates having a decreasing resilience in the wave propagation direction and are connected with each other in a frictional or torque-activated manner with intervening spaces which are offset relative to each other, so that when a force is applied normal to their surface, at least one mass-spring element is bent.

In contrast to the prior art, there is no separate spring element in the segmented wave conductor of the oscillation absorber in accordance with the invention. Instead, the required resilience is provided by the natural elastic properties of the mass elements. This is achieved by providing the mass elements in the form of flexible beams or plates which bend under oscillation-caused pressure or pull. Combined mass-spring elements are thus created.

The function of the flexible beams or plates is achieved in a particularly simple manner by providing the individual mass-spring elements with spacers, with at least one spacer of a mass-spring element being arranged between two spacers of the adjoining mass-spring element. Since the transfer of force takes place via the spacers, each spacer presses approximately against the center of the area of a mass-spring element which is supported between two spacers or the adjacent mass-spring element. Each mass-spring element is thus bent transversely to the direction of wave propagation.

The spring elements can also be made by notching or tapering a mass element to form flexible areas therein, each having a spacer disposed thereon.

A particularly simple way of creating a spacer between two mass-spring elements is by spot welding. So that there is sufficient spacing between the mass-spring elements, the welding spot should suitably be placed on a slight elevation created, for example, by stamping.

If the internal friction in the bending mass-spring elements should not be sufficient to fully damp the vibration, the wave conducting element can be provided with a reflection-free end, as disclosed in German Patent Publication DE 31 13 268 C2. To increase damping, it is also possible to surround the exterior wall areas of the wave conducting element (that is, the stack of mass-spring elements placed on top of each other in layers, connected by spacers) with a damping material. If required, this can then easily be removed again or replaced.

If the vibration absorber is intended to be effective in all three translatory and three rotational degrees of freedom, it is advantageous to dispose an additional spring and/or a damping material between the mass-spring elements.

Other objects, advantages and novel features of the present invention will become apparent from the following detailed description of the invention when considered in conjunction with the accompanying drawings.

BRIEF DESCRIPTION OF THE DRAWINGS

FIGS. 8a, b and c show a vibration absorber according to the invention made from a block of material;

FIG. 9 shows another embodiment of a vibration absorber according to the invention, also made from a single block; and FIG. 10 shows a plate-shaped vibration absorber according to the invention.

DETAILED DESCRIPTION OF THE DRAWING

Figure 1:
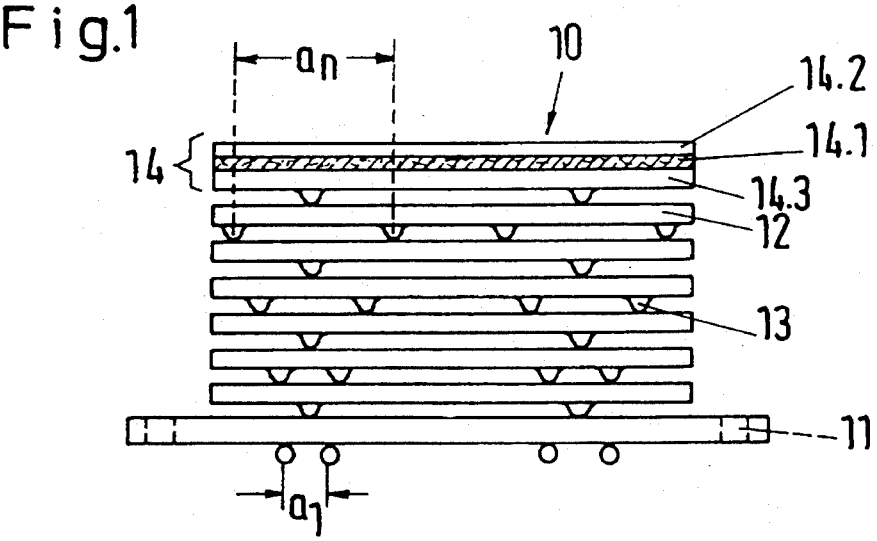
FIG. 1 is a cross section through a vibration absorber with a wave guide built up in layers according to the invention.

The basic embodiment of a vibration absorber 10 according to the invention is shown in FIG. 1. It consists of several identical metal plates 12 which are stacked above each other in layers, and connected via spacers 13. The spacers can be created by bulges in the metal plates, for example, on which two adjoining metal plates are then spot welded together. The spacers 13 of each metal plate 12 are located between two spacers 13 of the adjacent plate so that a pressing or pulling force applied perpendicular to the surface of the metal plates tends to bend the portion of the adjacent plate that is between the spacers 13, and it thus acts as a spring. A resilience which decreases in the direction of the wave propagation is achieved by increasing the distance $a_1, \ldots a_n$ between spacers 13 from the plate 11, used for attachment, to the end plate 14. The end plate 14, which is made as a sandwich of two metal plates 14.2 and 14.3 with a damping layer 14.1 located between them, acts as a reflection-free end. The entire oscillation absorber 10 is fastened in a frictionally and/or torque-activated manner on the component to be damped via the attachment plate 11.

Figure 2:
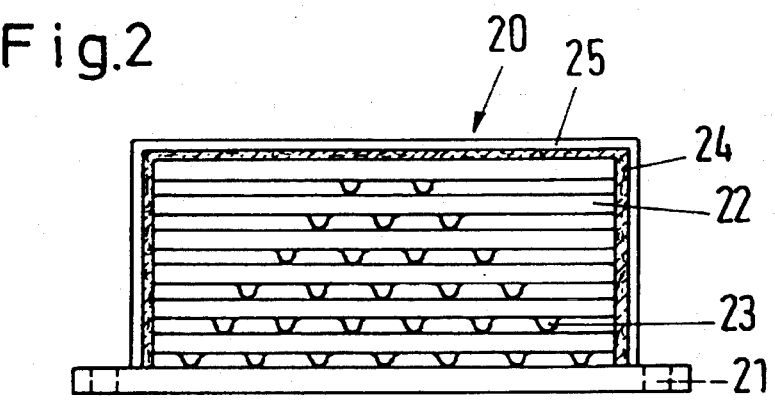
FIG. 2 shows an absorber similar to the one in FIG. 1, but with additional damping.

The oscillation absorber 20, shown in FIG. 2, acts in a similar manner. Here, too, a stack of metal plates 22, connected with each other via spacers 23, is disposed on an attachment plate 21. In this case the decreasing resilience (and decreasing wave speed along with it) are attained by reducing the number of spacers 23 between respective adjoining metal plates from layer to layer. In this embodiment, the entire stack of metal plates is enclosed in a housing 25, which has a damping layer 24 on the inside thereof that is coupled to the periphery of the metal plates 22, and dampens them.

In another embodiment of the invention, the spacers are attached asymmetrically in order to prevent a vibratory-dynamic degeneration with coinciding self-resonances. For example, in the embodiment of FIG. 1, the symmetry can be broken by varying the sequence of spacers 13 on the right and left side, the same as the sequence when looking into the depth of the illustration. In the exemplary embodiment of FIG. 2 the symmetry can be broken by disposing the spacers 23 off-centered in relation to the metal plate stack.

Figure 3:
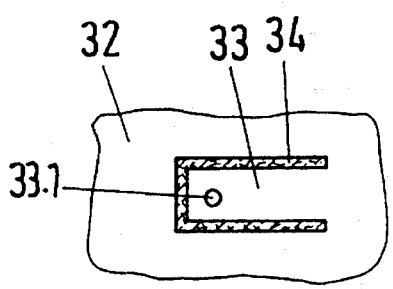
FIG. 3 is a top view of a mass-spring element with a broken away view of a spring.
Figure 4:
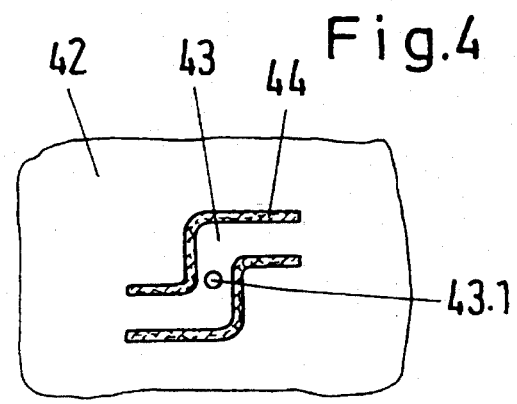
FIG. 4 is an alternate to the embodiment of FIG. 3.

With the exemplary embodiments of FIGS. 3 and 4, which respectively represent a sectional view of a metal plate of a plate stack, the spring elements 33, 43 are integrated into the metal plate 32, 42. In FIG. 3 the spring element 33 is an incised bar spring which, because of its shape, acts only perpendicularly in respect to the plane of metal plate 32. In contrast, the spring element 43 of FIG. 4 is effective in three translatory and three rotational degrees of freedom. The number of degrees of freedom can be varied by changing the shape of the notches which form the spring elements. The individual plates 32, 42 of FIGS. 3 and 4 are stacked in the same manner as in the exemplary embodiments of FIGS. 1 and 2 and are connected at the spots 33.1 or 34.1 with the respective adjoining metal plates. The bar springs 33, 43 can additionally be provided with damping by filling the recesses forming the bar springs with a damping material 34, 44.

Figure 5:
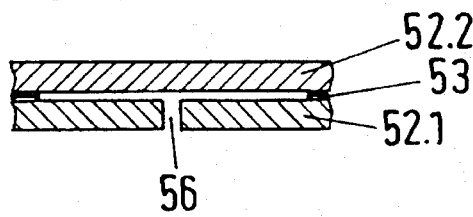
FIG. 5 shows a section of a vibration absorber built up in layers and having an additional air spring.

In the cross section through two adjacent metal plates 52.1 and 52.2 illustrated in FIG. 5, the spacers 53 enclose a volume of air between the metal plates 52.1 and 52.2, which acts as an additional spring. The rigidity and damping of the plates can thus be influenced by a conduit 56 in a metal plate 52.1.

Figure 6A:
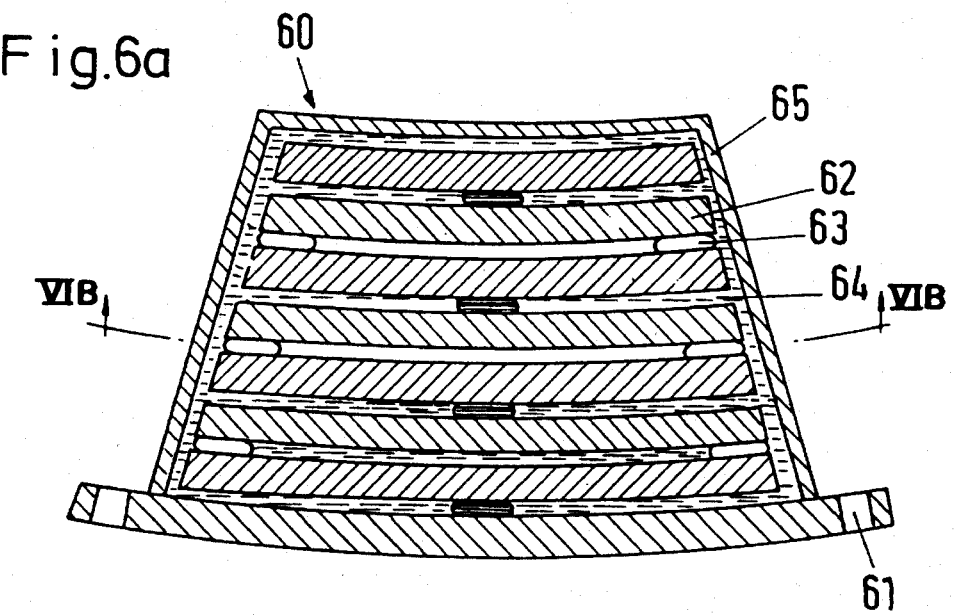
FIGS. 6a and 6b show a vibration absorber according to the invention, suitable for attachment to rotating components.
Figure 6B:
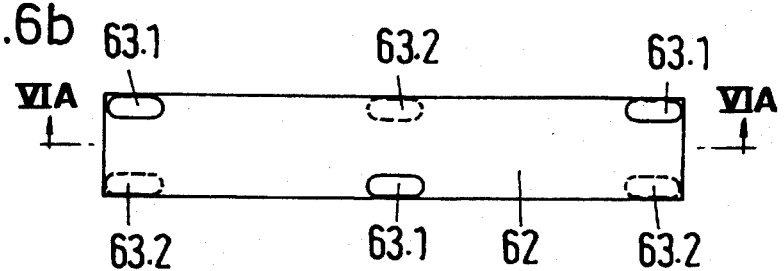

FIG. 6a is a lateral sectional view and FIG. 6b is a top sectional view through a vibration absorber which is preferably suitable for damping rotating components, such as track wheels. As can be seen in FIG. 6a, which is viewed along section line VIA–VIA of FIG. 6b, metal strips 62 are connected with each other by an alternately arranged sequence of spacers 63 in such a way that a spacer 63 of a metal plate 62 rests on a freestanding flat part of the neighboring metal plate. This is represented in FIG. 6b by means of the spacers 63.2 shown in dashed lines which, in contrast to the spacers 63.1, are a part of an adjoining metal plate resting above or below the metal plate 62. The entire stack of metal plates is again placed in a housing 65 tightly connected with the attachment plate 61 in order to assure stability also with respect to centrifugal loads. The housing 65 can be filled with oil 64 for additional damping.

Figure 7:
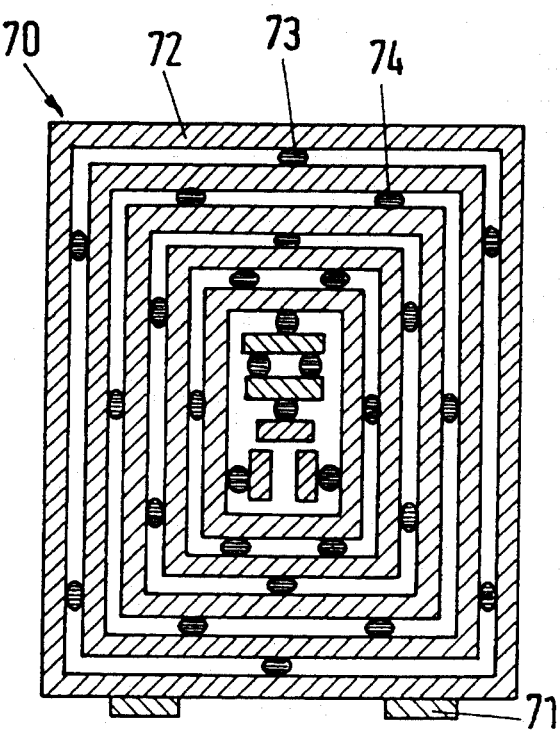
FIG. 7 is a cross section through a bar-shaped vibration absorber according to the invention.

The vibration absorber 70 of FIG. 7 is intended to be a semi-finished product or piece goods. The mass elements 72 in this embodiment form concentric box profiles supported by spacers 73, which are similar, for example, to the embodiments of FIGS. 3 and 4. A piece of this vibration absorber is bent away as needed and is connected at the outer box profile via attachments 71 with the component to be dampened, so that the wave propagation direction extends from the outer box profile toward the center. Thus, the inner part corresponds to the end of the wave conductor, in which damping elements 74 are present to form a reflection-free end. Arbitrary, different cross-sectional shapes can of course also be used in place of the rectangular box profile; in particular open profiles such as U-shaped or angular profiles may be used.

The vibration absorbers in accordance with FIGS. 8a and 9 are made by cutting notches in a monobloc (single block of material), and are particularly suitable for bar-shaped embodiments. (The block cross section can be arbitrarily selected; for example, it can be circular, square or rectangular.) FIG. 8a represents a vertical sectional view taken along line VIIIA–VIIIA of FIG. 8b, and FIG. 8b is a horizontal cross section of the vibration absorber 80 viewed along line VIIIB–VIIIB of FIG. 8a. FIG. 8c shows a horizontal cross section of an alternative embodiment. Mass elements 82 formed by notches 87 are connected with each other in a frictionally and torque-activated manner via remaining uncut portions of bars 83. In FIG. 8b, the notches are disposed parallel and in FIG. 8c diagonally to the sides. A decrease in resilience in the wave propagation direction starting at the attachment element 81, is achieved by increasing the cutting depth and/or decreasing the thickness of the mass elements 82 segmented by the notches. The notches have been applied around the circumference from all sides (as can be seen from the dotted lines and through notches in the cross section of FIG. 8a), and in addition asymmetrically, for removing of vibration degeneration because of symmetry of shape and to generate as many vibration directions as possible. A continuous friction rod 88 is located in tile center of the vibration absorber 80, the surface of which is covered by a damping layer 84, for example woven metallic wire.

The vibration absorber 90 of FIG. 9 is analogous to that of FIG. 8. Again, notches 97 in a monobloc create mass elements 92 with remaining bars 93. Damping is accomplished by damping inserts 94 in the notches 97. The vibration absorber 90 is attached via the fastener 91 on the component to be dampened.

The vibration absorber 100 in FIG. 10 is a cross sectional view of a plate shaped embodiment of the invention which is made by cutting notches in a circular blank. Starting at a central attachment 101, notches 107 of increasing cutting depth are provided. In the cross-sectional representation shown here, the notches 107 again create mass elements 102, which are connected by bars 103 in a frictionally and torque-activated manner. A reflection-free end in the form of a damping layer 104 is located at the outer edge of the disk in a manner analogous to the previous exemplary embodiments.

For reasons of space, oscillation absorbers for damping rod-shaped structures or pipes, which enclose them jacket-like, are advantageous. For this purpose it is also possible to embody the above described exemplary embodiments, which have rectangular or circular cross sections, as ring-shaped elements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A vibration absorbing element of the type comprising a plurality of layers of substantially parallel or concentric mass elements which are mechanically coupled for propagating vibrations in a direction substantially normal to a surface of such mass elements, wherein:

each of said mass elements comprises a resilient mass-spring element; and each of said mass-spring elements is coupled to adjacent mass-spring elements by spacers, location of said spacers as between adjacent mass-spring elements being offset relative to each other, whereby transmission of a force between adjacent mass-spring elements exerts a bending moment in at least one of said adjacent mass-spring elements.

2. Vibration absorbing element according to claim 1, wherein said respective mass-spring elements have a resilience which decreases in the direction of propagation of said vibrations.

3. Vibration absorbing element according to claim 2, wherein said mass-spring elements comprise one of: bending bars and plates.

4. Vibration absorbing element according to claim 3, wherein said mass-spring elements are coupled to each other by means of one of: frictionally and torque-activated spacers.

5. Vibration absorbing element according to claim 1, wherein at least one spacer of each of said mass-spring elements is located between two spacers of an adjacent mass-spring element.

6. Vibration absorbing element according to claim 2, wherein at least one spacer of each of said mass-spring elements is located between two spacers of an adjacent mass-spring element.

7. Vibration absorbing element according to claim 1, wherein at least a resilient area is formed in each mass-spring element by means of cutting or tapering said mass-spring element, with a spacer being arranged on said resilient area.

8. Vibration absorbing element according to claim 3, wherein at least a resilient area is formed in each mass-spring element by means of cutting or tapering said mass-spring element, with a spacer being arranged on said resilient area.

9. Vibration absorbing element according to claim 1, wherein said spacer comprises at spot weld.

10. Vibration absorbing element according to claim 5, wherein said spacer comprises at spot weld.

11. Vibration absorbing element according to claim 1, wherein said plurality of layers of mass-spring elements terminates in a reflection-free end.

12. Vibration absorbing element according to claim 2, wherein said plurality of layers of mass-spring elements terminates in a reflection-free end.

13. Vibration absorbing element according to claim 1, further comprising an exterior casing enclosing said plurality of layers of mass-spring elements, said casing having a damping material therein.

14. Vibration absorbing element according to claim 2, further comprising an exterior casing enclosing said plurality of layers of mass-spring elements, said casing having a damping material therein.

15. Vibration absorbing element according to claim 11, further comprising an exterior casing enclosing said plurality of layers of mass-spring elements, said casing having a damping material therein.

16. Vibration absorbing element according to claim 1, wherein there is disposed between said mass-spring elements a material which is one of: a resilient spring material and a damping material.

17. Vibration absorbing element according to claim 2, wherein there is disposed between said mass-spring elements a material which is one of: a resilient spring material and a damping material.

18. Vibration absorbing element according to claim 1, further comprising means for mounting said vibration absorbing element on a structure to absorb vibrations propagating therein.

19. Vibration absorbing element according to claim 1, wherein said vibration absorbing element is made from a single blank of resilient material, said mass-spring elements being formed and separated by cutting notches in said blank, with said spacers being formed by uncut material of said blank remaining in the plane of said notches.

20. Vibration absorbing element according to claim 19, wherein each of said notches is rotationally offset from adjacent notches in said blank of material.

21. Vibration absorbing element according to claim 20, wherein each notch is rotated approximately 90 degrees relative to adjacent notches.

22. Vibration absorbing element according to claim 19, wherein said mass-spring elements have a decreasing thickness in the direction of propagation of said vibrations.

23. Vibration absorbing element according to claim 21, wherein said mass-spring elements have a decreasing thickness in the direction of propagation of said vibrations.

24. Vibration absorbing element according to claim 19, wherein said notches are cut with increasing depth in the direction of propagation of said vibrations.

25. Vibration absorbing element according to claim 22, wherein said notches are cut with increasing depth in the direction of propagation of said vibrations.

26. Vibration absorbing element according to claim 19, wherein said blank of resilient material is a substantially flat disk, with concentric notches cut alternately on opposite surfaces thereof.

27. Vibration absorbing element according to claim 24, wherein said blank of resilient material is a substantially flat disk, with concentric notches cut alternately on opposite surfaces thereof.

* * * * *